March 23, 1954     W. ROWE ET AL     2,672,793
FLOOR STRUCTURE AND METHOD OF MAKING THE SAME
Filed Jan. 4, 1951
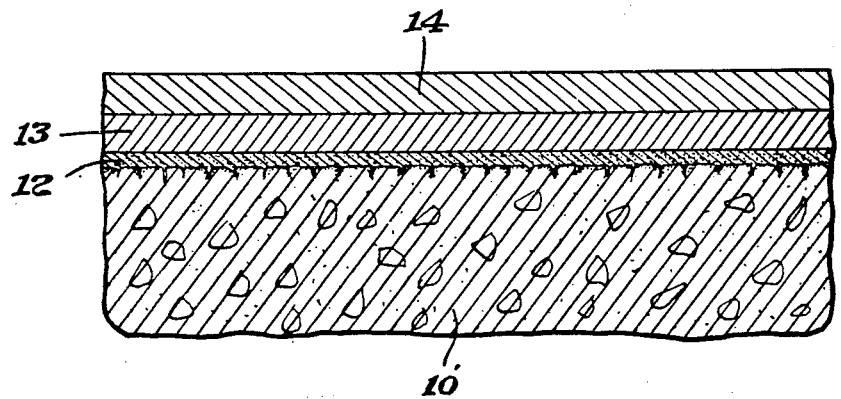
INVENTOR.
William Rowe.
BY Samuel A. Cohen.
J. Stanley Churchill
ATTORNEY Patented Mar. 23, 1954

2,672,793

UNITED STATES PATENT OFFICE 2,672,793

FLOOR STRUCTURE AND METHOD OF MAKING THE SAME

William Rowe, Lewiston, and Samuel A. Cohen, Auburn, Maine, assignors to Bonafide Mills, Inc., Lisbon, Maine, a corporation of Maine Application January 4, 1951, Serial No. 204,326

4 Claims. (Cl. 94—3)

This invention relates to a floor structure and to a method of making the same.

Prior to the present invention many attempts have been made to lay linoleum and the various forms of flexible floor coverings either in roll or tile form, such as the various forms of rubber and resinous tiles, asphaltic tile, and any of the other commercial floorings over sub-floors which are located on grade or below grade and also upon so-called "green" concrete floors, but as far as we are aware no satisfactory method has been proposed by which the deleterious effects of the water which is either contained in the floor or moisture and alkaline moisture which is drawn by capillarity therethrough may be overcome. As a result, when such finished floor materials have been laid over such sub-floors, the alkaline moisture, dampness and water soon causes the floors to buckle and the floor finish to become detached from the underlying sub-floor. We are aware of various patents in the prior art which purport to overcome this difficulty and solve the problem, but our commercial experience has indicated that the various adhesive compositions which have been suggested in such patents for application directly to the sub-floor and for adhesively affixing the floor finish thereto do not solve this problem, and as a result the present manufacturers of linoleum, rubber tile, and the like at present do not recommend installation where these adverse conditions are encountered, and particularly over on-grade or below-grade, and also upon "green" concrete floors.

We have discovered that satisfactory installations of floor-finishing materials, such as linoleum, rubber and asphalt tile, and the like may be successfully made utilizing a dual system of special bonding materials for adhesively affixing the floor-finishing material to the sub-floor and particularly to concrete floors where water conditions are apt to be encountered. The dual bonding system consists in the application to the sub-floor of a primer of a special character, as will be described, and then in the application over the primer of an adhesive composition of a special character, to be described, with the result that the moisture or alkaline conditions are prevented from destroying the bond between the floor-finishing material and the underlying adhesive layers.

With this general object in view, the invention consists in the floor structure and in the method of making the same hereinafter described and particularly defined in the claims at the end of this specification.

In the drawing we have illustrated in section a typical floor structure embodying the invention.

Referring to the drawing, 10 represents the sub-floor which may and preferably will comprise a concrete floor; 12, 13 represents respectively a priming layer and an adhesive layer applied to the sub-floor and bonded to one another; and 14 represents the layer of floor-finishing material bonded to the adhesive layer 13.

It has been heretofore recognized that a concrete floor, even when composed of the proper kind and amount of cement and aggregate, and also when properly cured, is porous and is not a homogeneous mass. When concrete floors are subjected to water conditions, water is drawn upwardly by capillarity through the many small pores and interstices in the concrete. In laying linoleum and other floor-finishing materials over such concrete floors attempts have heretofore been made to prevent such water from being drawn upwardly by capillarity so that the water would not destroy the bond between the floor-finishing material, such as linoleum or the like, and the adhesive layer by which the floor-finishing layer was bonded and secured to the surface of the concrete sub-floor. These attempts have included the use of various compositions which were added to the concrete mix prior to the laying of the sub-floor, and also the use of waterproofing compositions which were applied to the surface of the concrete floor after it had become set, in an attempt to impregnate the surface of the floor with a moistureproof pore-filling agent. Practical experience has shown that these prior attempted methods, for preventing the moisture or alkaline moisture from being drawn upwardly through the concrete and subsequently breaking the bond between the floor-finishing material and the adhesive employed in laying the floor-finishing material, have all been unsuccessful.

The present invention seeks to provide a solution to the problem, and in accordance therewith a special primer composition is utilized and applied to the surface of the concrete floor after the latter has become set and hardened. The composition of the primer is such that it has the ability to penetrate and work its way into the pores of the concrete, depositing a resinous material of a character which is unaffected by the lime or other alkaline substances normally present in concrete and which are leached into the water drawn by capillarity through the concrete. This resinous material becomes mechanically interlocked with the concrete, fills the pores, and possesses in itself good film strength. The resinous materials which have been successfully used for this include the various chlorinated rubbers, both natural and synthetic, chlorinated poly-phenyls, and the styrene-butadiene copolymers. Preferably, one or more of such resinous materials are dissolved in a solvent therefor, and a solution is produced having the required thickness and viscosity to enable it to properly penetrate into the pores of the concrete floor. When the surface of the concrete floor is smooth, it is preferred to incorporate into the primer a certain amount of asbestos and a water-settable cement, such as Portland cement, and when such a priming composition has been applied to the surface of the concrete and penetrated into a mechanically interlocked and pore-filling relationship the asbestos and cement is deposited in the continuous resinous layer on the surface of the concrete providing a surface which affords the opportunity for establishing a proper bond with the adhesive layer to be subsequently applied as will be described.

After the application of the priming coat there is applied, in accordance with the present invention, a special trowelable adhesive in a layer substantially thicker than the priming layer, and the adhesive is selected so as to bond thoroughly with the priming layer to be compatible therewith and to complete the sealing of any remaining pores in the impregnated and primed surface of the concrete, and at the same time to provide a relatively thick layer of adhesive for bonding with the floor-finishing layer. The adhesive composition embodies resinous materials which are also unaffected by lime or alkaline substances, and we have experienced particularly good results using one or more resinous materials selected from the group consisting of paracoumarone resins, the paracoumarone-indene resins, the styrene-butadiene copolymers, and the chlorinated natural and synthetic rubbers.

The following are examples of a primer suitable for use in producing the present floor structure:

EXAMPLE I

| | Pounds |
|---|---|
| High-flash naphtha | 1 451 |
| Parlon 10 cps | 1 95 |
| Aroclor 1254 | 1 52 |
| Aroclor 5460 | 1 31 |
| Asbestos 7M | 1 89 |
| White Portland cement | 1 502 |

1 Yield approximately 100 gallons.

In this example the high-flash naphtha comprises a commercial form of high-flash naphtha solvent obtained from The Barrett Manufacturing Company having the following characteristics, although other equivalent solvents could be used.

Distillation

First drop—not below 135° C. (275° F.)
Not over 5% to 130° C.
Not less than 90% to 145° C.
Dry point not above 155° C. (311° F.)
Flash point 105° F. Tag. open cup.

Instead of the high-flash naphtha referred to in Example I, we may utilize other solvents, for example the solvent marketed under the tradename "Solvesso No. 100" or a solvent marketed under the trade name "Shell TS–28R" or "Barrett No. 2" or the solvents marketed under the trade names "Neville Company 2–50W" and "Neville Company Cosol No. 1" and "Cosol No. 2." In addition to such solvents, xylol (B. P. 291° F.) or toluol (B. P. 230° F.) may be used as well as such solvents as Shell Tolu-Sol, which although lower in kauri-butanol value may be used with or without toluol. Where it is desired to obtain a faster evaporation toluol, xylol, or Shell Tolu-Sol may be used as a partial substitution for high-flash naphtha.

The characteristics of Solvesso No. 100 are as follows:

Distillation A. S. T. M. ° F.:
    Initial boiling point _____ 306
    10% _____ 311
    50% _____ 317
    90% _____ 327
    Dry point ° F _____ 343
Kauri-butanol value (toluol equal 100) _ 90
Mixed aniline point _____ 12.0
Percent aromatics _____ 90.0+
Flash ° F. (Tag. closed cup) _____ 100 min.

The characteristics of Shell TS–28R are as follows:

A. S. T. M. distillation ° F.:
    Initial boiling point _____ 318
    10% recovered _____ 328
    50% recovered _____ 339
    90% recovered _____ 370
    Final boiling point _____ 400
Flash, Tag. closed cup ° F _____ 110
Aromatic percent by volume _____ 76
Kauri-butanol value _____ 78
Mixed aniline point ° C _____ 28

The characteristics of some of the other solvents above referred to are as follows:

Barrett High-Flash Solvent No. 2

Flash ° F. (Tag. open cup) _____ 104
Kauri-butanol value _____ 79
Distillation range _____ 155° C.–199° C.
    (311° F.–390° F.)

Neville Company 2–50W Hi-Flash Solvent

Flash point not below 95° F.
Distillation range, entirely between 148° C. and 195° C. (298° F. to 383° F.).

Neville Company—Coal tar solvents

| Distillation Range | Cosol No. 1 | Cosol No. 2 |
|---|---|---|
| Initial (Minimum) | 150° C. (302° F.) | 155° C. (311° F.) |
| 5% (Maximum) | 155° C. | |
| 70-85% | | 235° C. |
| 85-95% | 210° C. | |
| End Point | 255° C. (490° F.) | 270° C. (518° F.) |
| Flash Point | above 100° F | above 115° F. |

Shell Tolu-Sol

Flash point ° F _____ 10
Kauri-butanol value _____ 45
Aniline point ° C _____ 43
A. S. T. M. distillation ° F.:
    Initial boiling point _____ 205
    10% recovered _____ 209
    50% recovered _____ 211
    90% recovered _____ 214
    Dry point _____ 218
Evaporation rate, similar to toluol.

The Parlon 10 cps. was obtained from the Hercules Powder Company and comprises a chlorinated natural rubber analyzing approximately 67% chlorine, and the viscosity determination was made utilizing a 20% by weight solution of Parlon in toluene at 25° C. utilizing a Bingham and Murray plastometer calibrated to read directly in centipoises. The Aroclors are chlorinated biphenyl and chlorinated poly-phenyls. The Parlon and Aroclor 1254 were chosen specifically for their low viscosity and their ability to penetrate into concrete. The solvent used is one that will also penetrate deeply into concrete. The Aroclor 5460 is a hard resin which forms a strong waterproof film on the surface of the concrete and which penetrates to some extent into the pores of the concrete. All of these resins are very resistant to the action of alkali and do not soften under the action of any of the alkaline solutions formed by the permeation of moisture through the concrete sub-floors on which the floor finish may be laid.

EXAMPLE II

| | Pounds |
|---|---|
| High-flash naphtha | 350 |
| Xylol (solvent) | 100 |
| Parlon 5 cps | 95 |
| Aroclor 5460 | 52 |
| Aroclor 1254 | 31 |
| Asbestos 7M | 89 |
| White Portland cement | 502 |

The composition of Example II follows Example I with the exception that a portion of the high-flash naphtha may be replaced by xylol.

EXAMPLE III

| | Pounds |
|---|---|
| High-flash solvent | 450 |
| Parlon 20 cps | 95 |
| Clorafin 42 (chlorinated paraffin) | 52 |
| Aroclor 5460 | 31 |
| Asbestos 7M | 89 |
| White Portland cement | 502 |

In this example a chlorinated paraffin commercially obtainable as Clorafin 42 is utilized instead of Aroclor 1254. The Clorafin 42 is obtained from the Hercules Powder Company and is made by the reaction of chlorine on paraffin wax and is a viscous liquid with a chlorine content of approximately 42–43%.

EXAMPLE IV

| | Pounds |
|---|---|
| Norvan 10 | 63 |
| High-flash naphtha | 320 |
| Aroclor 1254 | 30 |
| Aroclor 5460 | 33 |
| Asbestos 7M | 63 |
| White Portland cement | 356 |

Norvan 10 is a styrene-butadiene copolymer commercially obtainable from the Dewey and Almy Chemical Company.

EXAMPLES V

| | | |
|---|---|---|
| Pliolite S5 | pounds | 63 |
| High-flash naphtha | do | 320 |
| Aroclor 1254 | do | 30 |
| Aroclor 5460 | do | 33 |
| Asbestos 7M | do | 63 |
| White Portland cement | do | 356 |
| Pliolite S5 | do | 63 |
| High-flash naphtha | do | 160 |
| Socony Sovasol No. 75 | do | 30 |
| Aroclor 1254 | do | 30 |
| Aroclor 5460 | do | 33 |
| Asbestos 7T | do | 63 |
| White Portland cement | do | 356 |

| | |
|---|---|
| Pliolite S5 | 23.8 |
| Aroclor 1254 | 4.2 |
| High-flash naphtha | 21.0 |
| Solvesso No. 100 | 21.0 |
| Asbestos 7M | 4.5 |
| White Portland cement | 25.5 |
| Pliolite S5 | 23.8 |
| Clorafin 42 (chlorinated paraffin) | 4.2 |
| High-flash naphtha | 21.0 |
| Shell TS 28 solvent | 21.0 |
| Asbestos 7T | 4.5 |
| White Portland cement | 25.5 |

In these examples Pliolite S5 is a synthetic styrene-butadiene copolymer resin obtainable from the Goodyear Rubber Company. We prefer the use of 7M (long) asbestos; however, other grades, such as 7R or 7T (short), can be used. These gradings denote the quality and fiber length of the asbestos fibers. Grey Portland cement may be used in place of white Portland cement. Although Portland cement is preferred, other fillers, such as magnesium silicate, aluminum silicate, or ground mica may be used for part or all of the Portland cement. A small percentage of epichlorhydrin (½ to 3% based on the Parlon) may be used as a stabilizer for the chlorinated rubber. Epichlorhydrin is volatile, and if a non-volatile stabilizer is desired, Epon N34 (Shell Development Co.), an epichlorhydrin bis-phenol resin, ranging from 1 to 5% based on the Parlon may be used. Other stabilizers than indicated above may be used to retard the degradation of chlorinated rubber. If it is so desired, the primer may be colored in order to allow the applicator to be sure the floor is primed properly and that all areas of the floor are covered. Suspension agents may be used, such as aluminum stearate, calcium stearate or soya-lecithin to prevent hard setting of the fillers. One-fourth of one percent to three percent based on the filler content is usually recommended. The cement and asbestos are used in order to obtain tooth or grip for the adhesive, especially on a very smooth concrete floor.

When it is required to lay the floor finish upon a rough concrete floor the cement and asbestos in the foregoing primer compositions may be eliminated, and the following are examples of primer compositions which may be used if desired upon such rough concrete floors:

EXAMPLE VI

| | Pounds |
|---|---|
| High-flash solvent | 721 |
| Parlon 10 cps | 95 |
| Aroclor 1254 | 53 |
| Aroclor 5460 | 31 |

EXAMPLE VII

| | Pounds |
|---|---|
| High-flash naphtha | 541 |
| Xylol | 180 |
| Parlon 10 cps | 95 |
| Clorafin 42 | 52 |
| Aroclor 5460 | 31 |

EXAMPLE VIII

| | Pounds |
|---|---|
| Norvan 20 | 200 |
| Solvesso #100 | 1133 |

The commercial solvent sold as "Solvesso #100" is Esso Standard Oil Company's aromatic petroleum solvent distillation range of from 306 to 343° F., flash point 100° F. (Tag. closed cup).

EXAMPLE IX

| | Pounds |
|---|---|
| Norvan 10 | 200 |
| Toluol | 600 |
| Solvesso 100 | 200 |

In all of the foregoing examples, the solvent for the primer is of a slow evaporating character requiring a number of hours for evaporation, thereby affording ample time for the solution of the resin to work its way into the pores of the concrete and to fill the same and block the passage of moisture upwardly through the concrete. The distillation range varies from about 205° F. to about 518° F. with the major portion of the distillation of the solvent occurring in the range of about 300° F. to 400° F. Thus, the evaporation rate of the primer solvents disclosed herein is quite slow as compared with the solvent (methyl ethyl ketone) disclosed in the patent to Crockett, 2,529,799, which is a quick evaporating solvent that evaporates in a matter of seconds and thus dries immediately into a thin surface film without affording any time for the resinous solution to penetrate the pores of the concrete.

After the sub-floor has been primed with a suitable layer of any of the foregoing priming compositions the solvent is permitted to partially evaporate and enable the primer to penetrate into the pores of the sub-floor, and thereafter there is applied an adhesive composition of special character which is adapted to bond to the applied priming coat. The following are examples of adhesive compositions which may be used in producing the present floor structure:

I

| | Pounds |
|---|---|
| Methyl ethyl ketone (B. P. 176° F.) | 250 |
| Butyl Cellosolve | 35 |
| Paracoumarone-indene resins: | |
|    Hard M. P. (100–115° C.) | 269 |
|    Soft M. P. (45–55° C.) | 73 |
|    Soft M. P. (5–15° C.) | 35 |
| Parlon 125 cps | 14 |
| Parlon 1000 cps | 29 |
| Asbestos 7M | 90 |
| Portland cement | 500 |

II

| | Pounds |
|---|---|
| Methyl ethyl ketone | 490 |
| Heptane | 210 |
| Paracoumarone-indene resins: | |
|    Hard M. P. (100–115° C.) | 931 |
|    Soft M. P. (45–55° C.) | 248 |
|    Soft M. P. (5–15° C.) | 125 |
| Parlon 1000 cps | 100 |
| Asbestos 7M | 300 |
| Portland cement | 1680 |

III

| | Pounds |
|---|---|
| Methyl ethyl ketone | 636 |
| Butyl Cellosolve | 60 |
| Paracoumarone-indene resins: | |
|    Hard M. P. (100–115° C.) | 900 |
|    Soft M. P. (45–55° C.) | 240 |
|    Soft M. P. (5–15° C.) | 120 |
| Parlon 1000 cps | 94 |
| Paracril (Butadiene-acrylonitrile copolymer) | 50 |
| Asbestos | 300 |
| Portland cement | 1680 |

IV

| | |
|---|---|
| Butadiene-acrylonitrile copolymer | 13 |
| Paracoumarone-indene resin M. P. (115–125° C.) | 1 |
| Rosin | 18 |
| Whiting | 4 |
| Asbestine | 24 |
| Methyl ethyl ketone | 40 |

V

| | |
|---|---|
| Neoprene (chlorobutadiene polymer) | 40 |
| Paracoumarone-indene resin M. P. (115–125° C.) | 20 |
| Atomite (calcium carbonate pigment) | 20 |
| Methyl ethyl ketone | 35 |

VI

| | |
|---|---|
| Vinyl chloride-acetate resin copolymer | 8 |
| Butadiene-acrylonitrile copolymer | 30 |
| Asbestos fiber | 5 |
| Asbestine | 20 |
| Acetone (B. P. 133° F.) | 37 |

VII

| | |
|---|---|
| Natural rubber | 25 |
| Rosin | 15 |
| Clay | 10 |
| Asbestos | 10 |
| Methyl ethyl ketone | 25 |
| Toluol (B. P. 230° F.) | 15 |

VIII

| | Pounds |
|---|---|
| Manila gum DDB | 2176 |
| Denatured alcohol | 1310 |
| Cleaner's naphtha | 433 |
| Blown castor oil | 193 |

IX

| | Pounds |
|---|---|
| Denaturated alcohol | 17 |
| Trichlorethylene | 5 |
| Blown castor oil | 2 |
| Clay | 9 |
| Manila gum DDB | 21 |
| Whiting | 46 |

In all of the foregoing examples of adhesives, the solvent for the adhesive is of a quick evaporating character, requiring only a few minutes for evaporation so that the floor-layer can apply the covering material to the adhesive within a few minutes after the same has been spread upon the primer. The different solvents which are used in the production of the adhesive have boiling points lying between limits of 133° F. and 230° F. and the solvents are of a nature such that the range of distillation of each solvent is relatively narrow with limits of only a few degrees to either side of the boiling points specified herein.

The floor structure produced by the application to a concrete floor of any of the foregoing priming coats followed by application of any of the adhesives compositions and then by the application or laying of the sheet floor material, such as linoleum, any of the usual tiles now upon the market, and any of the sheet rubber compositions, such as rubber tile, produces a floor structure in which the finished floor material is bonded to the underlying sub-floor in such a manner as to reduce to a minimum the liability of detachment of the finished flooring under adverse moisture or alkaline moisture conditions, such as are experienced when the attempt is made to lay the flooring sheets upon sub-floors located upon or below grade.

It will be observed that the resinous materials forming the base of the primer and the resinous materials forming the base of the adhesive are similar in character with respect to their ability to resist and be unaffected by lime and the other alkaline substances which are present in concrete and which find their way into the water which is drawn by capillarity through the pores of concrete. Where rough concrete floors are encountered a priming composition may be used which does not include the cement and asbestos, and in such an instance reliance is placed upon the roughness of the surface to provide the necessary mechanical anchorage of the adhesive layer to the surface. In most instances, however, and particularly where relatively smooth concrete floors are encountered, it is desired that the primer include asbestos and cement in order to provide a character of surface which will afford the necessary mechanical anchorage for the adhesive layer. The compatibility of the resinous ingredients of both primer and adhesive layer provide a character of bond which insures that the adhesive layer will be firmly secured to the resinous primer. The adhesive layer serves to reinforce the resinous primer, and the bonded primer and adhesive form a strong unitary membrane of a waterproof character which resists and prevents the passage of water or alkaline moisture upwardly through the concrete for long periods of time, thus enabling the linoleum and other floor embodying the invention to remain in satisfactory condition even when installed at or below grade.

The presence of the cement at the surface of the priming layer further assists in taking care of and converting any water which might possibly pass through any unfilled pores of the impregnated concrete, thus assisting in the preservation of the strong bonds between the adhesive layer and the priming layer and between the adhesive layer and the linoleum or other floor-finishing material.

In order to provide comparative data as a measure of the utility of the present invention, test concrete blocks were produced using a mix of cement, sand, an aggregate, and water in order to obtain porous test blocks for the purpose of enabling accelerated or exaggerated tests to be made. After the blocks had been cured for one week, the priming composition as per Example I above set forth, was brushed thoroughly into the corresponding surface of each block and permitted to thoroughly dry. Thereafter the adhesive composition according to Example I was applied over the primer on some of the thus treated blocks, the application being made with a notched trowel and the adhesive permitted to dry for 24 hours. Sufficient primer and sufficient adhesive to thoroughly impregnate into the pores of the block and to provide a relatively thick adhesive layer were used following normal floor-laying practice.

In order to test the water resistance of the two sets of blocks, the first set having only the primer and the second set having the primer and the adhesive, a small amount of anhydrous calcium chloride in crystal form was placed on the comparable surface of each of two differently treated concrete blocks, and a watch crystal was placed over the calcium chloride on each block and made tight with a ring of putty to prevent any moisture in the air from reaching the calcium chloride. The blocks were then partially immersed in water up to within ⅛ inch of the treated surfaces, and it was found that those blocks which had been treated with primer alone withstood the action of the water up to a period of 72 hours, at the expiration of which the calcium chloride was completely hydrated. The concrete blocks which had been treated with both the primer and adhesive withstood the action of the water for periods exceeding 30 days before the calcium chloride became hydrated. Similar tests subjecting comparative blocks utilizing a head of water of about 20 inches demonstrated that the concrete blocks which had been treated only with the primer prevented the hydration of the calcium chloride crystals for only a few hours whereas the concrete blocks which had been treated both with the primer and the adhesive in accordance with the present invention resisted the action of the water for a period exceeding two weeks. Further comparative tests have been made along the foregoing lines of various competitive primers on the market as compared to the priming compositions which are recommended for use in producing the present floor structure, and in all instances the efficiency of such primers in preventing the passage of water through the blocks by capillarity was substantially less than those used in the present method.

Further tests have been made by producing concrete blocks 6 feet x 6 feet x 4 inches in thickness, and these blocks were made with normal concrete mixtures usually used in producing commercial concrete floors. After the concrete blocks were permitted to cure for one week they were placed in pans with a clearance of approximately 2 inches all around each block, including the bottom of the block. A primer according to Example I was applied to the surface of the block and permitted to dry thoroughly, and then the adhesive of Example I was applied, and commercial flooring tiles laid in the usual manner on the adhesive layer. Water was poured around the block to within a half inch of the surface, and this was continually replenished in order to keep the blocks wet, and after a period of over six months no loosening of the tiles has been noted.

Prior to the present invention difficulty has been experienced in locations on the south and west coasts of the United States which are characterized by clay soil under prolonged rainy conditions in preventing the release of the flooring material from the sub-floor when the moisture came through the sub-floor. It has been found that in such locations and during the rainy period the use of the present system of producing the present floor structure solved the difficulty and the floors adhered satisfactorily to the sub-floor during the rainy season as well as during the dry season.

The present method of producing the present floor structure has in addition to imparting durability to the floor structure when laid over floors on or below grade, the additional advantage that certain of the practices which have heretofore been employed may be eliminated. For example, the present floor-covering practice prior to the present invention required that the floor be thoroughly seasoned and dry, and the application of the floor finish over "green" concrete floors as a general rule has not been recommended. If any free lime was found on the surface of the concrete then the concrete was etched with a solution of acid.

The present method involving the application of the described primers followed by the application of the described adhesives may be readily made upon the floors without any prior treatment other than the removal of the dust. The sub-floor need not be thoroughly seasoned, and the primer can be applied as long as the surface is sufficiently dry to permit penetration.

Having thus described the invention, what is claimed is:

1. In a floor structure, in combination, a concrete floor on or below-grade subjected to external moisture drawn by capillarity through the pores thereof and which becomes contaminated by alkaline substances normally present in the concrete; means for adhesively securing a flexible covering to the concrete floor and for simultaneously minimizing the effect of moisture and alkaline moisture on the adhesive bond, said means comprising a priming layer resulting from the application of a solution of a relatively large amount of a penetrating relatively slow-drying solvent having a distillation range from about 205° F. to about 518° F. with the major portion of the solvent being distillable between the temperatures of about 300° F. to 400° F. and a lesser weight of moisture proof and alkaline resistant resinous material from which the solvent has been evaporated to deposit a film on the surface of the concrete and to provide depending pore-sealing fingers in the pores of the concrete in mechanical interlocking relation therewith to substantially block passage of moisture through the concrete to the upper surface thereof; a relatively thick, waterproof adhesive layer overlying the priming layer to complete the sealing of any remaining pores in the impregnated and primed surface of the concrete, said adhesive layer comprising a relatively fast-drying solvent having a boiling point from about 133° F. to about 230° F. and a waterproof and alkaline resistant resinous material; and a flexible floor covering disposed directly upon the adhesive layer and bonded to the concrete floor by said priming and adhesive layers.

2. In a floor structure, in combination, a concrete floor on or below-grade subjected to external moisture drawn by capillarity through the pores thereof and which becomes contaminated by alkaline substances normally present in the concrete; means for adhesively securing a flexible covering to the concrete floor and for simultaneously minimizing the effect of moisture and alkaline moisture on the adhesive bond, said means comprising a priming layer resulting from the application of a solution of a relatively large amount of a relatively slow-drying penetrating solvent and a lesser weight of moistureproof and alkaline resistant resinous material from which the solvent has been evaporated to deposit a film on the surface of the concrete and to provide depending pore-sealing fingers in the pores of the concrete in mechanical interlocking relation therewith to substantially block passage of moisture through the concrete to the upper surface there, said resinous material being selected from the group consisting of chlorinated rubbers both natural and synthetic, chlorinated polyphenyls, and styrene-butadiene copolymers; a relatively thick, waterproof adhesive layer overlying the priming layer to complete the sealing of any remaining pores in the impregnated and primed surface of the concrete, said adhesive layer comprising a relatively fast-drying solvent and a waterproof and alkaline resistant resinous material, said resinous material being selected from the group consisting of paracoumarone resins, paracoumarone-indene resins, styrene-butadiene copolymers, chlorinated natural and synthetic rubbers, and manila gum; and a flexible floor covering disposed directly upon the adhesive layer and bonded to the concrete floor by said priming and adhesive layers.

3. The method of adhesively affixing a flexible covering to a concrete floor on or below-grade subjected to external moisture drawn by capillarity through the pores thereof and which becomes contaminated by alkaline substances normally present in the concrete, the steps comprising: sealing the pores adjacent the upper surface of the concrete by applying thereto a thin, freely flowable, priming solution capable of penetrating substantially into the pores of the concrete to plug the same, said solution comprising a relatively large weight of a relatively slow-drying penetrating solvent having a distillation range from about 205° F. to about 518° F. with the major portion of the solvent being distillable between the temperatures of about 300° F. to 400° F. and a lesser weight of a moisture-proof and alkaline resistant resinous material; permitting substantially all of the solvent to evaporate to deposit a film on the surface of the concrete and to provide depending pore-sealing fingers in the pores of the concrete in mechanical interlocking relation therewith to substantially block passage of moisture through the concrete to the upper surface thereof; then applying a relatively thick, trowelable, waterproof, adhesive layer over the dry priming film to complete the sealing of any remaining pores in the impregnated and primed surface of the concrete, said adhesive layer comprising a relatively fast-drying solvent having a boiling point from about 133° F. to about 230° F. and a waterproof and alkaline resistant resinous material; and then placing the flexible floor covering directly upon the adhesive layer while the adhesive layer is in a tacky condition to bond the covering to the concrete floor.

4. The method of adhesively affixing a flexible covering to a concrete floor on or below-grade subjected to external moisture drawn by capillarity through the pores thereof and which becomes contaminated by alkaline substances normally present in the concrete, the steps comprising: sealing the pores adjacent the upper surface of the concrete by applying thereto a thin, freely flowable, relatively slow-drying priming solution capable of penetrating substantially into the pores of the concrete to plug the same, said solution comprising a relatively large amount of a penetrating solvent and a resinous material selected from the group consisting of chlorinated rubbers both natural and synthetic, chlorinated polyphenyls, and styrene-butadiene copolymers; permitting substantially all of the solvent to evaporate to deposit a film on the surface of the concrete and to provide depending pore-sealing fingers in the pores of the concrete in mechanical interlocking relation therewith to substantially block passage of moisture through the concrete to the upper surface thereof; then applying a relatively thick, trowelable, waterproof, adhesive layer over the dry priming film to complete the sealing of any remaining pores in the impregnated and primed surface of the concrete, said adhesive layer comprising a relatively fast-drying solvent and a resinous material selected from the group consisting of paracoumarone resins, paracoumarone-indene resins, styrene-butadiene copolymers, chlorinated natural and synthetic rubbers, and manila gum; and then placing the flexible floor covering directly upon the adhesive layer while the adhesive layer is in a tacky condition to bond the covering to the concrete floor.

WILLIAM ROWE.
SAMUEL A. COHEN.

References Cited in the file of this patent

UNITED STATES PATENTS

| Number | Name | Date |
|---|---|---|
| 1,721,367 | Barringer | July 16, 1929 |
| 2,054,869 | Smolak | Sept. 22, 1936 |
| 2,300,193 | Allen | Oct. 27, 1942 |
| 2,529,799 | Crockett | Nov. 14, 1950 |

FOREIGN PATENTS

| Number | Country | Date |
|---|---|---|
| 437,302 | Great Britain | Oct. 28, 1935 |